UNITED STATES PATENT OFFICE.

LUCIEN ROLAND, OF PARIS, FRANCE.

ELASTIC SUBSTANCE SIMILAR TO INDIA-RUBBER AND ITS METHOD OF MANUFACTURE.

No. 842,839.　　　　　　Specification of Letters Patent.　　　　　Patented Jan. 29, 1907.

Application filed May 26, 1906. Serial No. 318,924.

*To all whom it may concern:*

Be it known that I, LUCIEN ROLAND, a citizen of France, residing at Paris, in the Republic of France, have invented new and useful Improvements in an Elastic Substance Similar to India-Rubber and its Method of Manufacture, (for which a French patent has been filed March 13, 1906,) of which the following is a specification.

It has long been known that glycerin, gelatin, and chromic acid or its salts combined in certain proportions with or without water and then used or treated so that the water is evaporated forms an anhydrous tough material insoluble in water. The disadvantages of this material are that it will not stand hard usage or heat. Now I have found that if these constituent materials be combined with a given quantity of water and then in their liquid state run into molds of the desired shape, wherein they are allowed to cool, the molds being meanwhile exposed under normal conditions of temperature and pressure, the material will retain the water of hydration and will set in a few days into a solid hydrated compound no longer containing free water and no longer soluble in water, thoroughly stable, and capable of standing rough usuage and heat up to at least 100° centigrade.

Now by my present invention I use the above-mentioned reactions, but allow the water of hydration to remain throughout in the material as distinguished from the anhydrous process hitherto adopted. By my process the elastic substance is produced by the reciprocal reaction of a solution of chromic acid or of a bichromate on the aqueous mixture of gelatin and glycerin. A good result is obtained by operating, for instance, in the following manner: About eight kilograms of glue and six kilograms of gelatin are soaked in cold water, preferably for from twelve to twenty-four hours, until they have swollen up and are thoroughly soft. These are now melted in about fifteen kilograms of ordinary commercial glycerin testing 28° Baumé. The mixture is now heated to a temperature of about 65° centigrade and thoroughly well stirred, and there is then added, with constant stirring, a hot solution, at a temperature which may vary from 50° to 100° centigrade, of about five hundred and sixty grams of bichromate of potash and one hundred and forty grams of bichromate of soda in twelve hundred grams of water. The material is run into molds, cooled, and allowed to set for a few days, when it is ready for use. It will replace rubber in many of its applications, especially when rubber is required as an elastic filling.

Bichromate of ammonia or other chromate or mixture of bichromate with chromium alum may be employed. The substance thus obtained may be used in place of india-rubber in a large number of its applications and may serve more particularly for the manufacture of solid resilient tires for wheels of vehicles, being introduced therein in place of the pneumatic tube.

Having thus described my said invention, what I claim is—

1. An elastic substance analogous to caoutchouc, comprising a mixture of gelatin and of glycerin in a liquid state, with an aqueous solution of chromates or chromic acid, the quantity of glycerin exceeding by about one-tenth in weight that of the gelatin, while the quantity of chromates is equal to about five-hundredths of this quantity of gelatin, the weight of water employed for dissolving these chromates being finally equal to about two times the weight of the latter, a little more or a little less according as the proportion of glycerin in the mixture is more or less strong, this water remaining inclosed in the substance under the form of water of constitution, substantially as described.

2. The herein-described process consisting in mixing glycerin, gelatin and chromic acid or chromates with a quantity of water in the proportions specified, then allowing the mixture to set while retaining the water of hydration in combination whereby is formed a solid hydrated compound devoid of free water and insoluble in water, substantially as described.

3. The herein-described compound consisting in a solid hydrated mixture of glycerin, gelatin, and chromic acid or chromates in the proportions specified and devoid of free water, substantially as described.

In testimony whereof I have signed my name to this specification in the presence of two subscribing witnesses.

LUCIEN ROLAND.

Witnesses:
　JULES FAYOLLET,
　EUGÈNE PICHON.